(12) United States Patent
Pletcher et al.

(10) Patent No.: US 9,880,401 B2
(45) Date of Patent: Jan. 30, 2018

(54) METHOD, DEVICE AND SYSTEM FOR ACCESSING AN EYE-MOUNTABLE DEVICE WITH A USER INTERFACE

(71) Applicant: VERILY LIFE SCIENCES LLC, Mountain View, CA (US)

(72) Inventors: Nathan Pletcher, Mountain View, CA (US); Robert F. Wiser, San Francisco, CA (US); Daniel J. Yeager, Berkeley, CA (US); Shung-neng Lee, Sunnyvale, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 14/702,528

(22) Filed: May 1, 2015

(65) Prior Publication Data

US 2015/0362753 A1 Dec. 17, 2015

Related U.S. Application Data

(60) Provisional application No. 62/012,005, filed on Jun. 13, 2014.

(51) Int. Cl.
*G02C 7/08* (2006.01)
*G02C 7/04* (2006.01)
(Continued)

(52) U.S. Cl.
CPC ............ *G02C 7/083* (2013.01); *G02C 7/04* (2013.01); *G02C 11/10* (2013.01); *G06F 3/013* (2013.01);
(Continued)

(58) Field of Classification Search
CPC .......... G02C 7/083; G02C 7/04; G02C 7/101; G02C 11/10; G06F 3/013; G06F 3/04812; G06F 3/04842
(Continued)

(56) References Cited

U.S. PATENT DOCUMENTS

| | | |
|---|---|---|
| 7,311,398 B2 | 12/2007 | Kuiper et al. |
| 8,043,370 B2 | 10/2011 | Bretthauer et al. |

(Continued)

FOREIGN PATENT DOCUMENTS

| | | |
|---|---|---|
| EP | 2 518 555 A1 | 10/2012 |
| WO | WO 2013/086078 A1 | 6/2013 |

(Continued)

OTHER PUBLICATIONS

PCT/US2015/031420—International Search Report and Written Opinion, dated Aug. 11, 2015, 8 pages.

(Continued)

*Primary Examiner* — Jordan Schwartz
(74) *Attorney, Agent, or Firm* — Christensen O'Connor Johnson Kindness PLLC

(57) ABSTRACT

Techniques and mechanisms for providing access to an accommodation-capable eye-mountable device via a user interface of an auxiliary device. In an embodiment, the user interface provides prompts for a user of the eye-mountable device to perform various viewing actions, where the eye-mountable device receives from the auxiliary device communications indicating respective times of the viewing actions. Based on the communications, the eye-mountable device generates configuration information indicating a correspondence of respective states of the eye-mountable device to respective characteristics of the viewing actions. In another embodiment, operational modes of the eye-mountable device are defined based on the configuration information.

24 Claims, 8 Drawing Sheets

(51) Int. Cl.
*G02C 11/00* (2006.01)
*G06F 3/01* (2006.01)
*G06F 3/0484* (2013.01)
*G06F 3/0481* (2013.01)

(52) U.S. Cl.
CPC ...... *G06F 3/04812* (2013.01); *G06F 3/04842* (2013.01)

(58) Field of Classification Search
USPC ............ 351/159.03, 159.39, 159.4; 382/103
See application file for complete search history.

(56) References Cited

U.S. PATENT DOCUMENTS

| | | | |
|---|---|---|---|
| 8,096,654 B2 | 1/2012 | Amirparviz et al. | |
| 8,154,804 B2 | 4/2012 | McGinn et al. | |
| 8,545,555 B2 | 10/2013 | Berge | |
| 8,634,145 B2 | 1/2014 | Pugh et al. | |
| 8,636,358 B2 | 1/2014 | Binder | |
| 8,851,670 B2 | 10/2014 | Dai et al. | |
| 2007/0019279 A1 | 1/2007 | Goodall et al. | |
| 2008/0208335 A1 | 8/2008 | Blum et al. | |
| 2012/0075712 A1 | 3/2012 | Pugh et al. | |
| 2012/0140167 A1 | 6/2012 | Blum | |
| 2012/0194781 A1 | 8/2012 | Agurok | |
| 2012/0218301 A1 | 8/2012 | Miller | |
| 2012/0245444 A1 | 9/2012 | Otis et al. | |
| 2012/0250152 A1* | 10/2012 | Larson ............... G02B 27/2264 359/464 | |
| 2012/0268712 A1 | 10/2012 | Egan et al. | |
| 2013/0218270 A1* | 8/2013 | Blanckaert ........... A61B 5/1107 623/6.17 | |
| 2013/0245754 A1 | 9/2013 | Blum et al. | |
| 2013/0258275 A1 | 10/2013 | Toner et al. | |
| 2013/0258277 A1 | 10/2013 | Pugh et al. | |
| 2013/0338767 A1 | 12/2013 | Mazzocchi et al. | |
| 2014/0098226 A1 | 4/2014 | Pletcher et al. | |
| 2014/0107447 A1 | 4/2014 | Liu et al. | |
| 2014/0107448 A1 | 4/2014 | Liu et al. | |
| 2014/0192318 A1 | 7/2014 | Guth et al. | |
| 2014/0194773 A1 | 7/2014 | Pletcher et al. | |
| 2014/0209481 A1 | 7/2014 | Pletcher et al. | |
| 2014/0213867 A1 | 7/2014 | Pletcher et al. | |
| 2014/0240655 A1 | 8/2014 | Pugh et al. | |
| 2014/0243971 A1 | 8/2014 | Pugh et al. | |
| 2014/0327875 A1 | 11/2014 | Blum et al. | |
| 2015/0062533 A1 | 3/2015 | Toner et al. | |
| 2015/0087249 A1* | 3/2015 | Pugh ..................... H04B 1/385 455/90.3 |
| 2015/0215601 A1* | 7/2015 | Zhou ..................... H04N 13/042 348/43 |
| 2015/0331241 A1* | 11/2015 | Haddick ............ G06T 19/006 345/629 |
| 2015/0338915 A1* | 11/2015 | Publicover ......... H04N 5/23229 345/633 |
| 2016/0147301 A1* | 5/2016 | Iwasaki ................. G06F 3/013 345/157 |

FOREIGN PATENT DOCUMENTS

| | | |
|---|---|---|
| WO | WO 2014/106330 A1 | 7/2014 |
| WO | WO 2015/015205 A1 | 2/2015 |

OTHER PUBLICATIONS

De Smet, J. et al., "Progress toward a liquid crystal contact lens display", Journal of the SID 21/9, DOI: 10.1002/jsid.188, 2014 pp. 399-406.

De Smet, J. et al., "A Liquid Crystal Based Contact Lens Display Using PEDOT: PSS and Obliquely Evaporated SiO2", Late-News Poster, SID 2012 Digest, pp. 1375-1378.

Milton, H. et al., "Optimization of refractive liquid crystal lenses using an efficient multigrid simulation", May 2012, vol. 20, No. 10, Optics Express, pp. 11159-11165.

Milton, H. et al., "Switchable liquid crystal contact lenses: dynamic vision for the ageing eye", Proc. of SPIE vol. 9004 90040H, 6 pages. Downloaded From: http://spiedigitallibrary.org/ on Mar. 28, 2014.

Milton, H. et al., "Electronic liquid crystal contact lenses for the correction of presbyopia", Apr. 2014, vol. 22, No. 7, DOI:10.1364/OE.22.008035, Optics Express, pp. 8035-8040.

Tremblay, E. et al. "Switchable telescopic contact lens", Jul. 2013, vol. 21, No. 13, DOI:10.1364/OE.21.015980, Optics Express, pp. 15980-15986.

\* cited by examiner

Configuration Information 500

| Mode ID 502 | OSV 504 | Transition State 506 |
|---|---|---|
| Ma | Va | Sa = {ca,...} |
| Mb | Vb | Sb = {cb,...} |
| ⋮ | | |

Configuration Information 510

| Mode ID 520 | Sub-Mode ID 525 | OSV 530 | Sub-Mode Transition State 535 | Mode Transition State 540 | Next Mode ID 545 |
|---|---|---|---|---|---|
| Ma | Ma1 | Va1 | Sa1 = {ca1,...} | SA = {CA,...} | Mn |
| | Ma2 | Va2 | Sa2 = {ca2,...} | | |
| Mb | Mb1 | Vb1 | Sb1 = {cb1,...} | SB = {CB,...} | Ma |
| | Mb2 | Vb2 | Sb2 = {cb2,...} | | |
| ⋮ | | | | | |
| Mn | Mn1 | Vn1 | Sn1 = {cn1,...} | SN = {CN,...} | Mb |
| | Mn2 | Vn2 | Sn2 = {cn2,...} | | |

FIG. 5

METHOD, DEVICE AND SYSTEM FOR ACCESSING AN EYE-MOUNTABLE DEVICE WITH A USER INTERFACE

RELATED APPLICATIONS

This application claims priority under the provisions of 35 U.S.C. § 119(e) to U.S. Provisional Application No. 62/012,005 filed Jun. 13, 2014, the contents of which are incorporated herein by reference.

BACKGROUND

1. Technical Field

This disclosure relates generally to the field of optics, and in particular but not exclusively, relates to contact lenses.

2. Background Art

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle can degrade due to Presbyopia or other progressive age-related conditions affecting the focusing strength of the eye. Recent technologies have begun to provide for various devices that operate in or on a human eye to aid the visual focus of a user. For one type of these devices, an accommodating lens includes one or more liquid crystal elements and circuitry to apply an electrical current to change the index of refraction of the one or more elements.

Like many burgeoning technologies, successive generations of such devices are likely to provide improved sensitivity, efficiency, responsiveness, functionality, etc. Therefore, as the number and variety of accommodation-capable devices grows over time, there is expected to be an increased demand for convenient access to configure or evaluate performance by these eye-mountable devices.

BRIEF DESCRIPTION OF THE DRAWINGS

The various embodiments of the present invention are illustrated by way of example, and not by way of limitation, in the figures of the accompanying drawings and in which:

FIG. 5 illustrates elements of configuration information determined with an eye-mountable device, in accordance with an embodiment of the disclosure.

DETAILED DESCRIPTION

Figure 1:
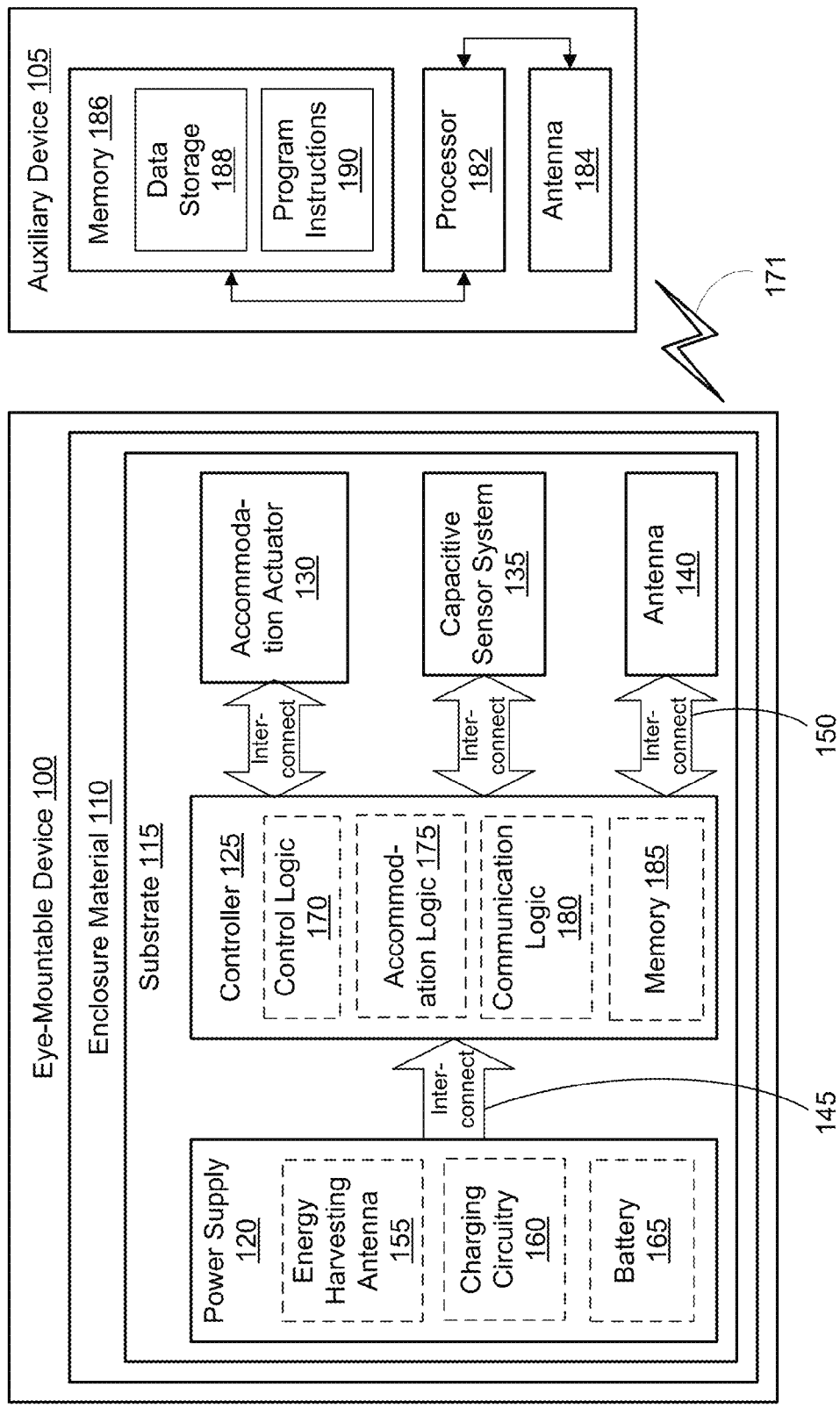
FIG. 1 is a functional block diagram of system to exchange communications with an eye-mountable device, in accordance with an embodiment of the disclosure.

Embodiments of an apparatus, system and methods of accessing an eye-mountable, accommodation-capable device are described herein. In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein is a device to provide access to a smart contact lens or other eye-mountable device (EMD) via a user interface. Some embodiments are directed to an eye-mountable device to be accessed by such a user interface. Embodiments of the eye-mountable device may include communication circuitry, control electronics and an accommodation actuator all embedded within an enclosure material formed to be contact mounted to an eye. The control electronics are coupled to drive the accommodation actuator to control the optical power of the eye-mountable device. In some embodiments, the control electronics store or otherwise access information to select, log or otherwise indicate an operational mode of the eye-mountable device.

The enclosure material may be fabricated of a variety of materials compatible for direct contact with a human eye, such as a polymeric material, a hydrogel, PMMA, silicone based polymers (e.g., fluoro-silicon acrylate), or otherwise. The enclosure material may be in the form of a round lens with a concave curvature configured to mount to a corneal surface of an eye. The electronics may be disposed upon a substrate embedded within the enclosure material near its periphery to avoid interference with incident light received closer to the central region of the cornea. In some embodiments, gaze direction or other focal distance information from a capacitive sensor, photodetector system or other sensor mechanism of the eye-mountable device may be used to determine the amount of accommodation to be applied via a see-through accommodation actuator positioned in a central portion of the enclosure material. The accommodation actuator may be coupled to the controller to be electrically manipulated thereby. For example, the accommodation actuator may be implemented with a liquid crystal cell that changes its index of refraction in response to an applied electrical bias signal. In other embodiments, the accommodation actuator may be implemented using other types of electro-active optical materials such as electro-optic materials that vary refractive index in the presence of an applied electric field or electro-mechanical structures that change the shape of a deformable lens. Other example structures that may be used to implement the accommodation actuator include electro-wetting optics, micro-electro-mechanical systems, or otherwise.

Features of various embodiments are described herein in the context of an eye-mountable accommodating lens device, wherein an optical strength (e.g., corresponding to a particular focal length) of the device may be changed based on capacitive gaze tracking mechanisms. However, such description may be extended to additionally or alternatively apply to any of a variety of other accommodating optical devices that may operate in or on an eye of a user. For example, certain embodiments are not limited with respect to a particular mechanism (e.g., liquid crystal element or other) by which an accommodation actuator changes an optical strength of the device. Furthermore, some embodiments are not limited with respect to a capacitive gaze tracking, photodetector gaze tracking of other technique that may be used to determine whether a change in optical strength is to take place.

FIG. 1 is a functional block diagram of an accommodation-capable eye-mountable device 100 to be accessed via an auxiliary device 105, in accordance with an embodiment of the disclosure. An exposed portion of EMD 100 may include an enclosure material 110 formed to be contact-mounted to a corneal surface of an eye. A substrate 115 may be embedded within or surrounded by enclosure material 110 to provide a mounting surface for a power supply 120, a controller 125, an accommodation actuator 130, a capacitive sensor system 135, an antenna 140, and various interconnects 145 and 150. The illustrated embodiment of power supply 120 includes an energy harvesting antenna 155, charging circuitry 160, and a battery 165. The illustrated embodiment of controller 125 includes control logic 170, accommodation logic 175, and communication logic 180. The illustrated embodiment of auxiliary device 105 includes a processor 182, an antenna 184, and memory 186. The illustrated embodiment of memory 186 includes data storage 188 and program instructions 190.

Controller 125 may be coupled to receive feedback control signals from capacitive sensor system 135 and further coupled to operate accommodation actuator 130. Power supply 120 supplies operating voltages to the controller 125 and/or the accommodation actuator 130. Antenna 140 may be operated by the controller 125 to communicate information to and/or from eye-mountable device 100. In one embodiment, antenna 140, controller 125, power supply 120, and capacitive sensor system 135 are all situated on the embedded substrate 115. In one embodiment, accommodation actuator 130 may be embedded within enclosure material 110, but is not disposed on substrate 115. Because eye-mountable device 100 includes electronics and is configured to be contact-mounted to an eye, it is also referred to herein as an ophthalmic electronics platform, contact lens, or smart contact lens.

To facilitate contact-mounting, the enclosure material 110 may have a concave surface configured to adhere ("mount") to a moistened corneal surface (e.g., by capillary forces with a tear film coating the corneal surface). Additionally or alternatively, the eye-mountable device 100 may be adhered by a vacuum force between the corneal surface and enclosure material 110 due to the concave curvature. While mounted with the concave surface against the eye, the outward-facing surface of the enclosure material 110 may have a convex curvature that is formed to not interfere with eye-lid motion while the eye-mountable device 100 is mounted to the eye. For example, the enclosure material 110 may be a substantially transparent curved disk shaped similarly to a contact lens.

Enclosure material 110 may include one or more biocompatible materials, such as those employed for use in contact lenses or other ophthalmic applications involving direct contact with the corneal surface. Enclosure material 110 may optionally be formed in part from such biocompatible materials or may include an outer coating with such biocompatible materials. Enclosure material 110 may include materials configured to moisturize the corneal surface, such as hydrogels and the like. In some instances, enclosure material 110 may be a deformable ("non-rigid") material to enhance wearer comfort. In some instances, enclosure material 110 may be shaped to provide a predetermined, vision-correcting optical power, such as can be provided by a contact lens. Enclosure material may be fabricated of various materials including a polymeric material, a hydrogel, PMMA, silicone based polymers (e.g., fluoro-silicon acrylate), or otherwise.

Substrate 115 includes one or more surfaces suitable for mounting the capacitive sensor system 135, controller 125, power supply 120, and antenna 140. Substrate 115 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) may be patterned on substrate 115 to form circuitry, electrodes, etc. For example, antenna 140 may be formed by depositing a pattern of gold or another conductive material on substrate 115. Similarly, interconnects 145 and 150 may be formed by depositing suitable patterns of conductive materials on substrate 115. A combination of resists, masks, and deposition techniques may be employed to pattern materials on substrate 115. Substrate 115 may be a relatively rigid material, such as polyethylene terephthalate ("PET") or another material sufficient to structurally support the circuitry and/or electronics within enclosure material 110. Eye-mountable device 100 may alternatively be arranged with a group of unconnected substrates rather than a single substrate. For example, controller 125 and power supply 120 may be mounted to one substrate, while antenna 140 and capacitive sensor system 135 are mounted to another substrate and the two may be electrically connected via interconnects.

In some embodiments, power supply 120 and controller 125 (and the substrate 115) may be positioned away from the center of eye-mountable device 100 and thereby avoid interference with light transmission to the eye through the center of eye-mountable device 110. In contrast, accommodation actuator 130 may be centrally positioned to apply optical accommodation to the light transmitted to the eye through the center of eye-mountable device 110. For example, where eye-mountable device 100 is shaped as a concave-curved disk, substrate 115 may be embedded around the periphery (e.g., near the outer circumference) of the disk. In some embodiments, capacitive sensor system 135 includes one or more discrete capacitance sensors that are peripherally distributed to sense the eyelid overlap. In some embodiments, one or more capacitance sensors may also be positioned in the center region of eye-mountable device 100. Capacitive sensor system 135 and/or substrate 115 may be substantially transparent to incoming visible light to mitigate interference with light transmission to the eye.

Substrate 115 may be shaped as a flattened ring with a radial width dimension sufficient to provide a mounting platform for the embedded electronics components. Substrate 115 may have a thickness sufficiently small to allow the substrate to be embedded in enclosure material 110 without adversely influencing the profile of eye-mountable device 100. Substrate 115 may have a thickness sufficiently large to provide structural stability suitable for supporting the electronics mounted thereon. For example, substrate 115 may be shaped as a ring with a diameter of about 10 millimeters, a radial width of about 1 millimeter (e.g., an outer radius 1 millimeter larger than an inner radius), and a thickness of about 50 micrometers. Substrate 115 may optionally be aligned with the curvature of the eye-mounting surface of eye-mountable device 100 (e.g., convex surface). For example, substrate 115 may be shaped along the surface of an imaginary cone between two circular segments that define an inner radius and an outer radius. In such an example, the surface of substrate 115 along the surface of the imaginary cone defines an inclined surface that is approximately aligned with the curvature of the eye mounting surface at that radius.

In the illustrated embodiment, power supply 120 includes a battery 165 to power the various embedded electronics, including controller 125. Battery 165 may be inductively charged by charging circuitry 160 and energy harvesting antenna 155. In one embodiment, antenna 140 and energy harvesting antenna 155 are independent antennae, which serve their respective functions of energy harvesting and communications. In another embodiment, energy harvesting antenna 155 and antenna 140 are the same physical antenna that are time shared for their respective functions of inductive charging and wireless communications with auxiliary device 105. Additionally or alternatively, power supply 120 may include a solar cell ("photovoltaic cell") to capture energy from incoming ultraviolet, visible, and/or infrared radiation. Furthermore, an inertial power scavenging system may be included to capture energy from ambient vibrations.

Charging circuitry 160 may include a rectifier/regulator to condition the captured energy for charging battery 165 or directly power controller 125 without battery 165. Charging circuitry 160 may also include one or more energy storage devices to mitigate high frequency variations in energy harvesting antenna 155. For example, one or more energy storage devices (e.g., a capacitor, an inductor, etc.) may be connected to function as a low-pass filter.

Controller 125 contains logic to choreograph the operation of the other embedded components. Control logic 170 controls the general operation of eye-mountable device 100, including providing a logical user interface, power control functionality, etc. Accommodation logic 175 includes logic for monitoring feedback signals from capacitive sensor system 135, determining the current gaze direction or focal distance of the user, and manipulating accommodation actuator 130 in response to provide the appropriate accommodation. The auto-accommodation may be implemented in real-time based upon feedback from the capacitive gaze tracking, or permit user control to select specific accommodation regimes (e.g., near-field accommodation for reading, far-field accommodation for regular activities, etc.). Circuitry of controller 125 may include or couple to a repository on substrate 115—as represented by the illustrative memory 185 (e.g., including volatile memory cells)—that, for example, is to store data written by such circuitry, data to determine operation of such circuitry and/or data received by (or to be sent from) EMD 100. Such a repository may store log information that describes performance of accommodation logic 175 and/or other components of controller 125.

Communication logic 180 provides communication protocols for wireless communication with auxiliary device 105 via antenna 140. In one embodiment, communication logic 180 provides backscatter communication via antenna 140 when in the presence of an electromagnetic field 171 output from auxiliary device 105. In one embodiment, communication logic 180 operates as a smart wireless radio-frequency identification ("RFID") tag that modulates the impedance of antenna 140 for backscatter wireless communications. The various logic modules of controller 125 may be implemented in software/firmware executed on a general purpose microprocessor, in hardware (e.g., application specific integrated circuit), or a combination of both.

Eye-mountable device 100 may include various other embedded electronics and logic modules. For example, a light source or pixel array may be included to provide visible feedback to the user. An accelerometer or gyroscope may be included to provide positional, rotational, directional or acceleration feedback information to controller 125.

It is noted that the block diagram shown in FIG. 1 is described in connection with functional modules for convenience in description, but does not necessarily connote physical organization. Rather, embodiments of eye-mountable device 100 may be arranged with one or more of the functional modules ("sub-systems") implemented in a single chip, multiple chips, in one or more integrated circuits, or otherwise.

Auxiliary device 105 includes an antenna 184 (or group of more than one antennae) to send and receive wireless signals 171 to and from eye-mountable device 100. Auxiliary device 105 also includes a computing system with a processor 182 in communication with a memory 186. Memory 186 may be a non-transitory computer-readable medium that may include, without limitation, magnetic disks, optical disks, organic memory, and/or any other volatile (e.g. RAM) or non-volatile (e.g. ROM) storage system readable by the processor 182. Memory 186 may include a data storage 188 to store indications of data, such as data logs (e.g., user logs), program settings (e.g., to adjust behavior of eye-mountable device 100 and/or auxiliary device 105), etc. Memory 186 may also include program instructions 190 for execution by processor 182 to cause the auxiliary device 105 to perform processes specified by the instructions 190. For example, program instructions 190 may cause auxiliary device 105 to provide a user interface that allows for retrieving information communicated from eye-mountable device 100 or allows transmitting information to eye-mountable device 100 to program or otherwise select operational modes of eye-mountable device 100. Auxiliary device 105 may also include one or more hardware components for operating antenna 184 to send and receive wireless signals 171 to and from eye-mountable device 100.

Auxiliary device 105 may be a smart phone, digital assistant, or other portable computing device with wireless connectivity sufficient to provide the wireless communication link 171. Auxiliary device 105 may also be implemented as an antenna module that may be plugged in to a portable computing device, such as in an example where the communication link 171 operates at carrier frequencies not commonly employed in portable computing devices. In some instances, auxiliary device 105 is a special-purpose device configured to be worn relatively near a wearer's eye to allow the wireless communication link 171 to operate with a low power budget. For example, the auxiliary device 105 may be integrated in a piece of jewelry such as a necklace, earing, etc. or integrated in an article of clothing worn near the head, such as a hat, headband, etc.

Figure 2A:
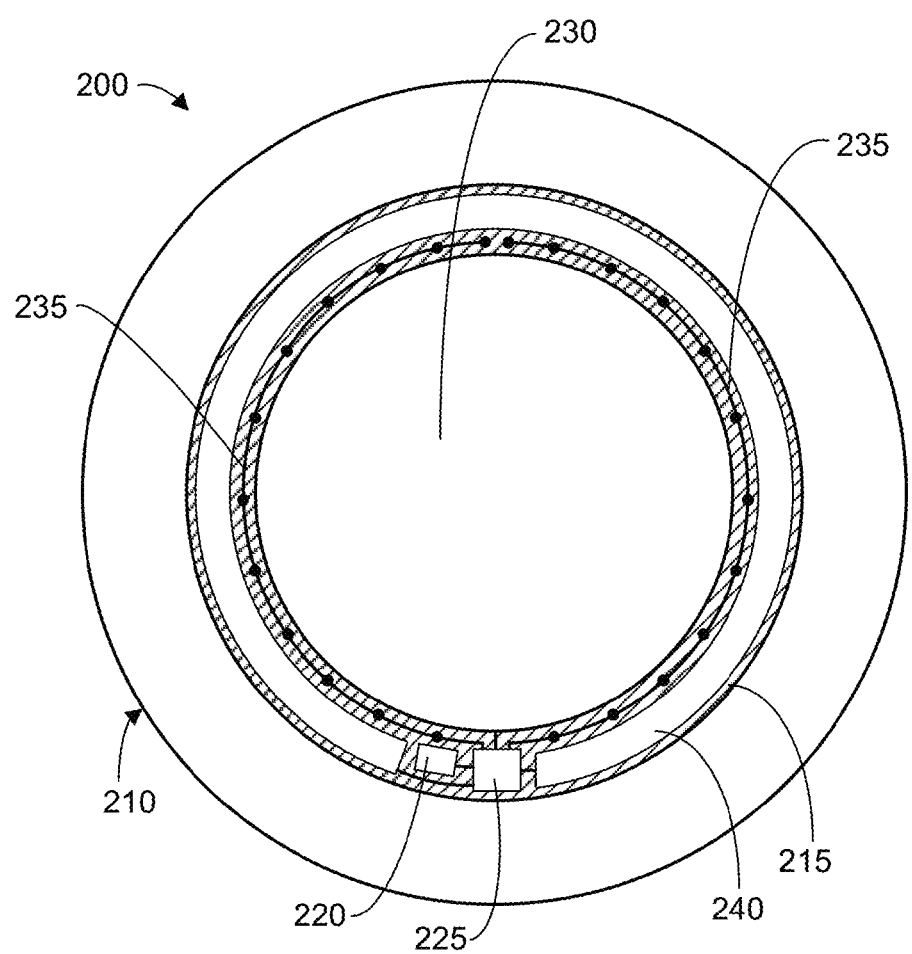
FIG. 2A is a top view of an eye-mountable device, in accordance with an embodiment of the disclosure.
Figure 2B:
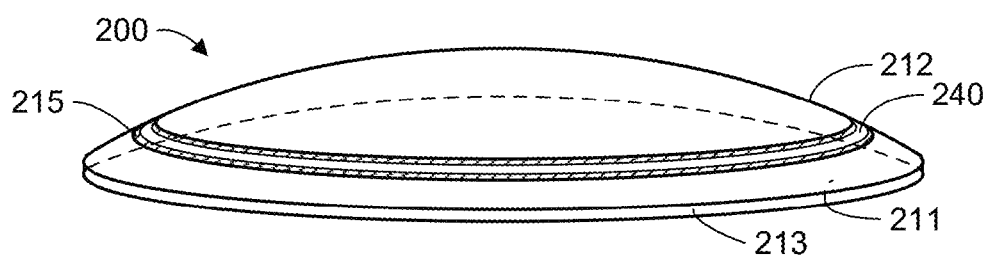
FIG. 2B is a perspective view of an eye-mountable device, in accordance with an embodiment of the disclosure.

FIGS. 2A and 2B illustrate two views of an eye-mountable device 200, in accordance with an embodiment of the disclosure. FIG. 2A is a top view of EMD 200 while FIG. 2B is a perspective view of the same. Eye-mountable device 200 is one possible implementation of eye-mountable device 100 illustrated in FIG. 1. The illustrated embodiment of eye-mountable device 200 includes an enclosure material 210, a substrate 215, a power supply 220, a controller 225, an accommodation actuator 230, a capacitive sensor system 235, and an antenna 240. It should be appreciated that FIGS. 2A and 2B are not necessarily drawn to scale, but have been illustrated for purposes of explanation only in describing the arrangement of the example eye-mountable device 200.

Enclosure material 210 of eye-mountable device 200 may be shaped as a curved disk. Enclosure material 210 is a substantially transparent material to allow incident light to be transmitted to the eye while eye-mountable device 200 is mounted to the eye. Enclosure material 210 may be a biocompatible material similar to those employed to form vision correction and/or cosmetic contact lenses in optometry, such as a polymeric material, polyethylene terephthalate ("PET"), polymethyl methacrylate ("PMMA"), polyhydroxyethylmethacrylate ("polyHEMA"), a hydrogel, silicon based polymers (e.g., fluoro-silicon acrylate) combinations of these, or otherwise. Enclosure material 210 may be formed with one side having a concave surface 211 suitable to fit over a corneal surface of an eye. The opposite side of the disk may have a convex surface 212 that does not interfere with eyelid motion while eye-mountable device 200 is mounted to the eye. In the illustrated embodiment, a circular or oval outer side edge 213 connects the concave surface 211 and convex surface 212.

Eye-mountable device 200 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of eye-mountable device 200 may be selected according to the size and/or shape of the corneal surface of the wearer's eye. Enclosure material 210 may be formed with a curved shape in a variety of ways. For example, techniques similar to those employed to form vision-correction contact lenses, such as heat molding, injection molding, spin casting, etc. may be employed to form enclosure material 210.

Substrate 215 may be embedded within enclosure material 210. Substrate 215 may be embedded to be situated along the outer periphery of enclosure material 210, away from the central region where accommodation actuator 230 is positioned. In the illustrated embodiment, substrate 215 encircles accommodation actuator 230. Substrate 215 may not interfere with vision because it is too close to the eye to be in focus and is positioned away from the central region where incident light is transmitted to the light-sensing portions of the eye. In some embodiments, substrate 215 may optionally be formed of a transparent material to further mitigate effects on visual perception. Substrate 215 may be shaped as a flat, circular ring (e.g., a disk with a centered hole). The flat surface of substrate 215 (e.g., along the radial width) may be a platform for mounting electronics and for patterning conductive materials to form electrodes, antenna (e), and/or interconnections.

Capacitive sensor system 235 may be distributed about eye-mountable device 200 to sense eyelid overlap in a manner similar to capacitive touch screens. By monitoring the amount and position of eyelid overlap, feedback signals from capacitive sensor system 235 may be measured by controller 225 to determine the approximate gaze direction and/or focal distance. Capacitive sensor system 235 may be disposed within enclosure material 210 on substrate 215. In the illustrated embodiment, capacitive sensor system 235 is distributed peripherally around accommodation actuator 230 along the inner edge of substrate 215 between antenna 240 and accommodation actuator 230. In other embodiments, capacitive sensor system 235 may be alternatively distributed in or on eye-mountable device 200. In the illustrated embodiment, capacitive sensor system 235 includes a plurality of discrete capacitance sensors coupled to a common read-line; however, various implementations include a single elongated capacitance sensor, a plurality of discrete capacitance sensors, multiple discrete capacitance sensors coupled in parallel via a common read-line, multiple independent branches of parallel coupled discrete capacitance sensors, etc. In another embodiment, photodetectors are variously disposed on eye-mountable device 200 to provide for monitoring of viewing actions based on light levels (e.g., including changes in such levels, etc.) rather than, or in addition to, capacitive sensing.

Accommodation actuator 230 may be centrally positioned within enclosure material 210 to affect the optical power of eye-mountable device 200 in the user's center of vision. In various embodiments, accommodation actuator 230 operates by changing its index of refraction under the influence of controller 225. By changing its refractive index, the net optical power of the curved surfaces of eye-mountable device 200 may be altered, thereby applying controllable accommodation. Accommodation actuator 230 may be implemented using a variety of different electro-active optical devices. For example, accommodation actuator 230 may be implemented using a layer of liquid crystal (e.g., a liquid crystal cell) disposed in the center of enclosure material 210. In other embodiments, accommodation actuator 230 may be implemented using other types of electro-active optical materials such as electro-optic materials that vary refractive index in the presence of an applied electric field. Accommodation actuator 230 may be a distinct device embedded within enclosure material 210 (e.g., liquid crystal cell), or a bulk material having a controllable refractive index. In yet another embodiment, accommodation actuator 230 may be implemented using a deformable lens structure that changes shape under the influence of an electrical signal. Accordingly, the optical power of eye-mountable device 200 may be controlled by controller 225 with the application of electric signals via one or more electrodes extending from controller 225 to accommodation actuator 230.

Accommodation actuator 230 may be implemented using a variety of different liquid crystal structures including nematic liquid crystal, nematic twisted liquid crystal, cholesteric liquid crystal, or blue phase liquid crystal. Since a low switching voltage is desirable for low power chip design, nematic liquid crystals with switching voltages less than 5 V are suitable. With the application of a 5V control signal, refractive index switching ranging from approximately 1.74 in an off-mode to 1.52 in an on-mode is achievable. A refractive index shift of 0.2 should be sufficient to provide near-field accommodation for reading.

Returning to FIG. 2A, loop antenna 240 is a layer of conductive material patterned along the flat surface of the substrate to form a flat conductive ring. In some examples, to allow additional flexibility along the curvature of the enclosure material, loop antenna 240 may include multiple substantially concentric sections electrically joined together. Each section may then flex independently along the concave/convex curvature of eye-mountable device 200. In some examples, loop antenna 240 may be formed without making a complete loop. For instances, antenna 240 may have a cutout to allow room for controller 225 and power supply 220, as illustrated in FIG. 2A. However, loop antenna 240 may also be arranged as a continuous strip of conductive material that wraps entirely around the flat surface of substrate 215 one or more times. For example, a strip of conductive material with multiple windings may be patterned on the backside of substrate 215 opposite controller 225, power supply 220, and capacitive sensor system 235. Interconnects between the ends of such a wound antenna (e.g., the antenna leads) may then be passed through substrate 215 to controller 225.

Figure 3:
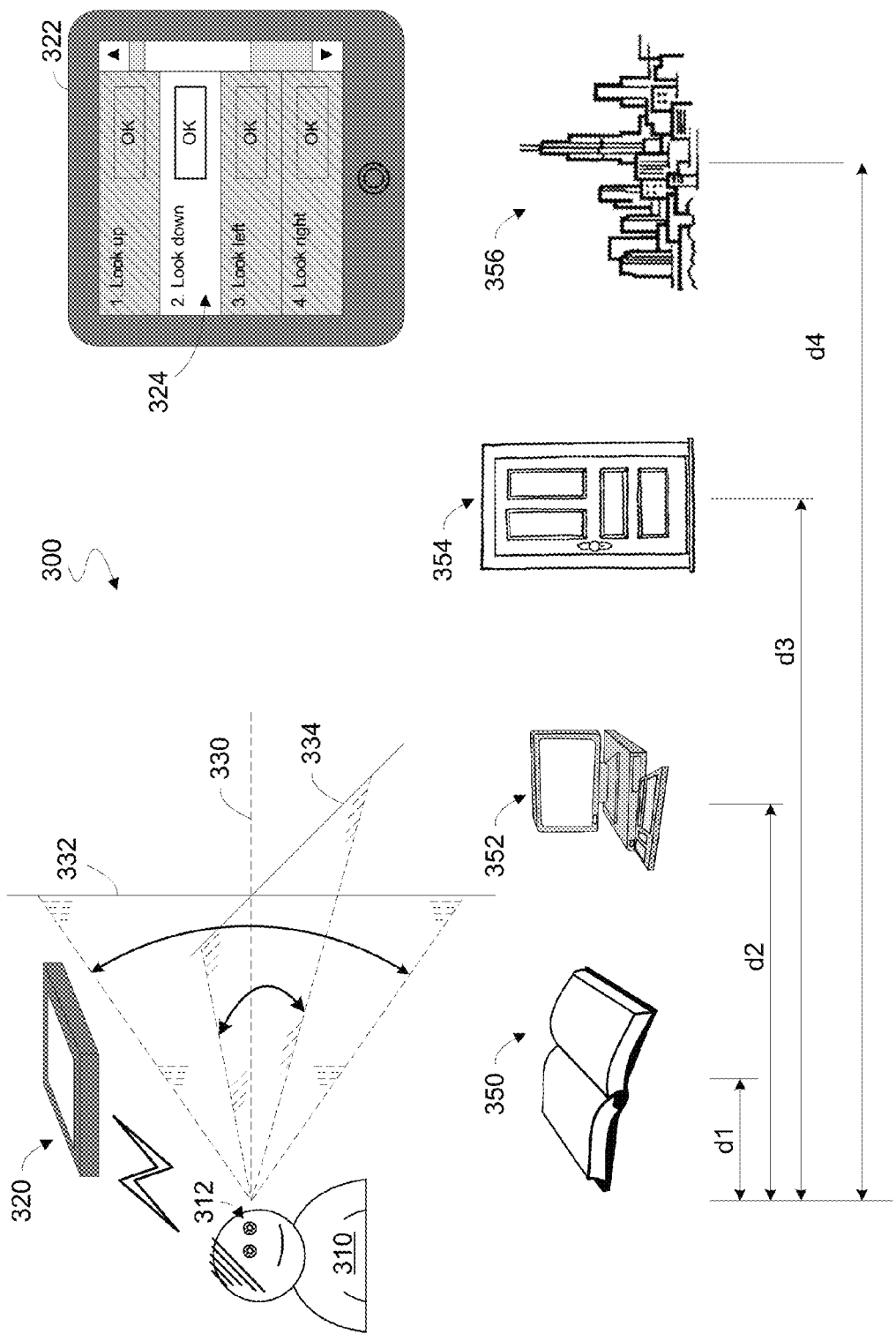
FIG. 3 illustrates elements of an environment in which an eye-mountable device is accessed via a user interface, in accordance with an embodiment of the disclosure.

FIG. 3 shows features of an environment 300 in which an accommodation-capable EMD is accessed according to an embodiment. The EMD may include some or all of the features of EMD 100 or EMD 200, for example. Accessing the EMD may be performed with an auxiliary device, as represented by the illustrative device 320. Device 320 may include some of all of the features of auxiliary device 105.

In an illustrative scenario according to one embodiment, an eye of a user 310 in environment 300 has an EMD 312 disposed therein or thereon. Device 320 may be operated—e.g., by user 310, an ophthalmologist, optometrist, optician, technician or the like—to access EMD 312. Certain features of various embodiments are described herein with reference to exchanges between an auxiliary device, such as device 320, and a single EMD in or on a user's eye. However, such description may be extended to variously apply to exchanges each between the auxiliary device and a respective one of two EMDs in or on different eyes of a user.

Access to EMD 312 may include exchanging between EMD 312 and device 320 wireless communications including information that, for example, is to configure or otherwise determine one or more parameters each defining, at least in part, a respective operational mode of EMD 312. Alternatively or in addition, such communications may include information that describes some earlier operation of EMD 312 by the user. Some communications may additionally or alternatively aid in EMD 312 defining one or more actions by user 310 that are to each serve as a respective explicit command to EMD 312.

In some embodiments, device 320 includes logic—e.g., including processor 182 executing at least part of program instructions 190, or other hardware and/or executing software—configured to provide a user interface. One example of such an interface of device 320 is represented in detail view 322 by the illustrative graphical user interface (GUI) 324.

GUI may present one or more prompts each for user 310 to perform a respective operation. For example, communications exchanged between EMD 312 and device 320 may be in aid of operations to calibrate and/or train EMD 312 based on a sequence of actions performed by user 310—e.g., including one or more viewing actions with EMD 312. A viewing action may include, for example, user 310 directing his gaze in a particular direction (or within a particular area of a field of view), moving a direction of his gaze along a particular path and/or focusing on some object at a particular distance (or within a particular range of distances). Alternatively or in addition, a viewing action may include user 310 blinking (e.g., once or according to a particular blink sequence), closing his eyes, rolling his eyes, crossing his eyes and/or the like.

By way of illustration and not limitation, a user interface may present to user 310 (or to another person operating device 320) a series of visual, audio, haptic and/or other prompts for user 310 to perform various viewing actions, as represented by the illustrative prompts of GUI 324 to look up, look down, look, left, look right, etc. In response to such prompts, viewing actions may be performed by user 310 to aid in EMD 310 generating sensor information, concurrent with such viewing actions, and identifying various correspondence of such sensor information to respective ones of such viewing actions. For example, EMD 312 may identify sensor information as variously representing one or more reference directions and/or regions in a field of view of user 310, one or more optical strengths to be selectively provided by accommodation functionality of EMD 312, one or more viewing actions each to serve as a respective explicit command to EMD 312, and/or the like.

User 310 or some other operator of device 320 may provide a visual, touch, audio, inertial, pressure, stress, temperature or other input via GUI 324 (or other such interface mechanism of device 320) to indicate that user 310 is currently or imminently performing a prompted action. For example, device 320 may include a camera and eye tracking logic to determine a direction of viewing by user 310. User 310 may be successively prompted to focus at markings, objects and/or other items each a different respective distance from user 310. One example of such items is represented by the illustrative book 350 at a distance d1, desktop computer 352 at a distance d2, door 354 at a distance d3, and a view 356 of a horizon distance d4 from user 310. While user 310 is focusing on an item at a given distance, device 320 may signal EMD 312 to successively provide different accommodation levels at different times, while user 310 is prompted (by GUI 324 and/or an operator of device 320) to indicate a preferred one of the accommodation levels. A preferred accommodation level may be indicated by input provided via GUI 324 and then communicated to EMD 312. For example, a correspondence of the preferred accommodation level to the given distance (and/or a range of distances including that distance) may be determined by EMD 312 based on such input via GUI 324 and/or associated communications between EMD 312 and device 320.

Alternatively or in addition, user 310 may be prompted to successively gaze in one or more directions offset from a field-of-view centerline 330 along a horizontal line 334 and/or at one or more directions offset from centerline 330 along a vertical line 332. A capacitive sensor, photodetector system or other sensor mechanism of EMD 312 may generate sensor information while user 310 is gazing in a particular direction, wherein communications between EMD 312 and device 320 result in training of EMD—e.g., the training including EMD storing configuration information indicating a correspondence of the sensor information to the gaze direction. Such training may further comprise EMD 312 determining an association of a direction of gaze of user 312 (e.g., including associating a field of gaze directions) with a level of accommodation by EMD 312. The association of a given optical strength with a field of gaze directions may be based in part on information provided by a manufacturer of the EMD, an eye prescription for the user of the EMD and/or other a priori information. For example, a EMD manufacturer, distributer or other agency may provide information describing pre-defined fields of gaze directions to be associated, respectively, with relatively near distance viewing and relatively far distance viewing.

Figure 4A:
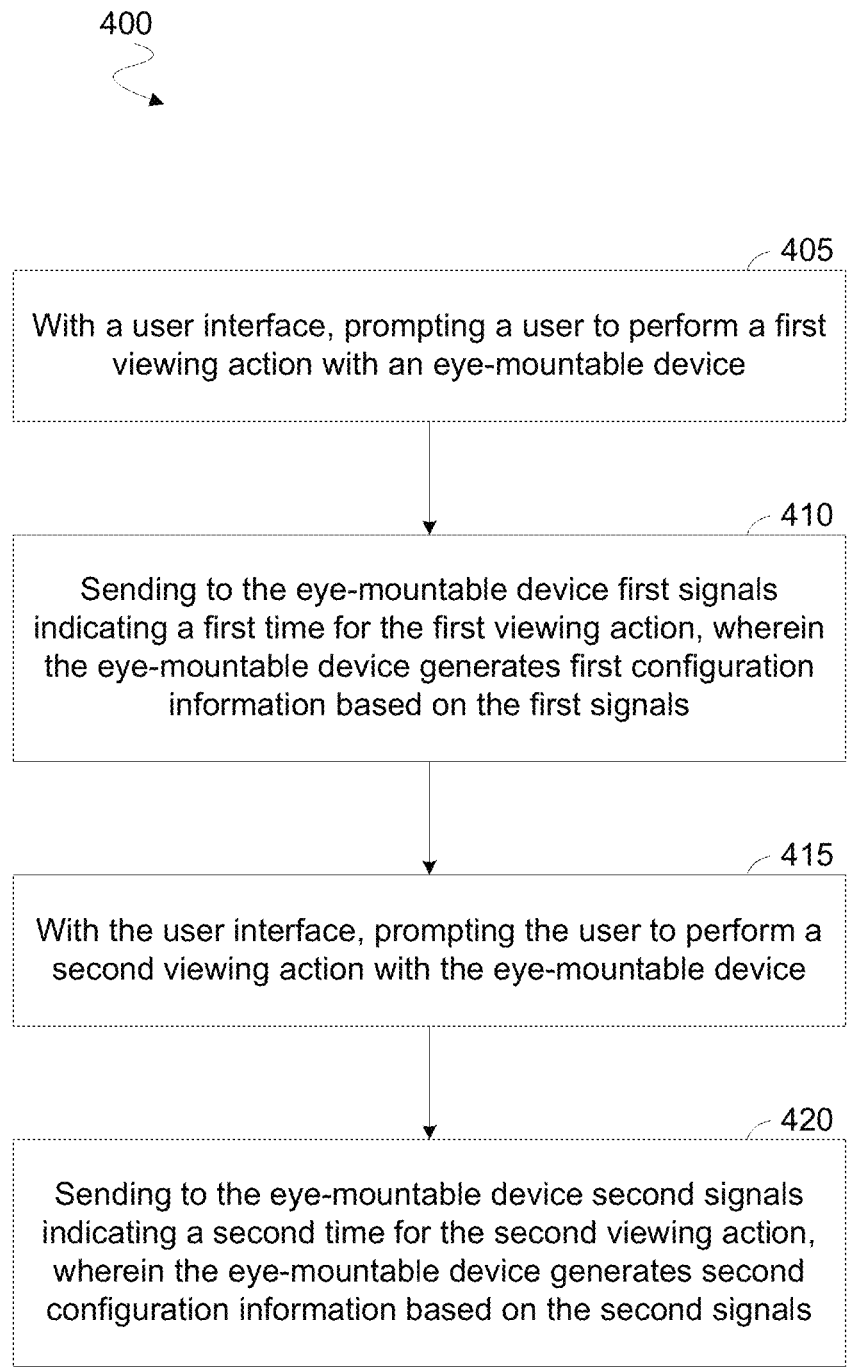
FIG. 4A is a flow diagram illustrating elements of a method for providing access to an eye-mountable device via a user interface, in accordance with an embodiment of the disclosure.

FIG. 4A illustrates elements of a method 400 to enable configuration of an eye-mountable device with a user interface according to an embodiment. In an embodiment, method 400 is performed with a device having some or all of the features of auxiliary device 105, for example. Operations of method 400 may be performed in environment 300 (or other such environment) to configure one or more EMDs.

Method 400 may include, at 405, prompting a user, with a user interface of the device, to perform a first viewing action with an eye-mountable device disposed in or on an eye of the user. The user interface may include one or more display, audio, touch, haptic and/or other interface mechanisms including, but not limited to, some or all of a display, keyboard, mouse, touchscreen, touchpad, video camera, microphone, speaker, motion sensor etc. In one embodiment, the user interface includes one or more input and/or output mechanisms that do not require a user of an EMD to deviate from some viewing action to indicate performance of the viewing action via interaction with the user interface. Examples of such one or more mechanisms include, but are not limited to, a video camera and eye-tracking software, an audio speaker and a haptic sensor, inertial sensor, pressure sensor, stress sensor, temperature sensor or the like. The prompting at 405 may include the interface displaying or otherwise representing to a user of the device—e.g., the user of the EMD, a physician or a technician—a direction in which the user of the EMD is to gaze and/or a distance at which (or distance range in which) the user of the EMD is to focus.

Method 400 may further comprise, at 410, sending to the eye-mountable device first signals indicating a first time for the first viewing action, wherein the eye-mountable device generates first configuration information based on the first signals. For example, the first time may be based on or otherwise correspond to a time of an interaction by the user of the device with the user interface. By way of illustration and not limitation, method 400 may comprise other operations (not shown) including the user interface receiving an input at the time of a current or imminent performance of the first viewing action. Alternatively, the user interface may provide a sound, vibration or other output indicating to the user when the first viewing action is to be performed. Based on the performance time indicated by such interaction via the user interface, the device may generate the first signals sent to the EMD at 410. In one embodiment, the first signals identify the first time to the EMD, where the EMD identifies the first state of the EMD (e.g., including sensor information generated at the EMD) as being concurrent with the identified first time. Alternatively, the EMD may stream or otherwise send successively generated state information to the device, wherein the device identifies a particular portion of such state information as being coincidental with the first time. The device may then communicate such coincidence to the EMD in the first signals sent at 210.

The first configuration information may correspond a characteristic of the first viewing action with a first state of the eye-mountable device during the first time. A first operational mode of the eye-mountable device may be defined, implemented and/or otherwise determined based on the first configuration information. The first configuration may include a definition of the first operational mode, the definition specifying or otherwise indicating, for example, an accommodation level to be provided by the EMD during the first operational mode. Alternatively or in addition, the definition of the first operational mode may specify or otherwise indicate a direction of gaze (e.g., by indicating a field of directions) of the EMD user during the operational mode.

Method 400 may further comprise, at 415, prompting the user of the EMD with the user interface to perform a second viewing action with the eye-mountable device. The prompting at 415 may include features similar to those of the prompting at 405, where the second viewing action is different than the first viewing action. For example, the first viewing action and the second viewing action may differ from one another with respect to a focus and/or a direction of gaze by the user of the EMD.

In an embodiment, method 400 comprises, at 420, sending second signals to the eye-mountable device, the second signals indicating a second time for a second viewing action, wherein the eye-mountable device generates second configuration information based on the second signals. The second configuration information may correspond a characteristic of the second viewing action with a second state of the eye-mountable device during the second time. A second operational mode of the eye-mountable device may be defined, implemented and/or otherwise determined based on the second configuration information. Definition of two such operational modes may provide for later operation of the EMD wherein control logic of the EMD is to access such definitions to select or otherwise determine a level of accommodation to implement.

Figure 4B:
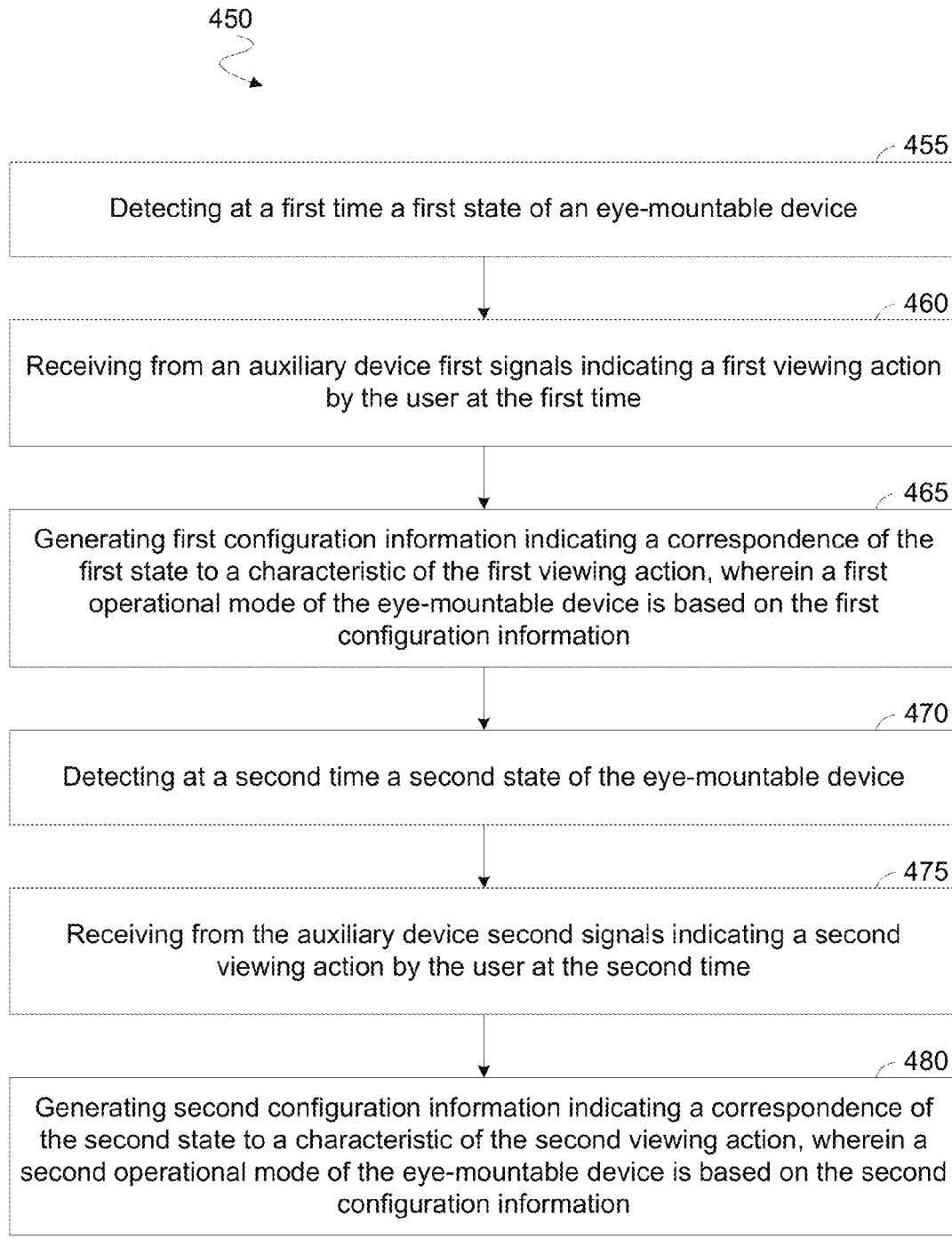
FIG. 4B is a flow diagram illustrating elements of a method for operating an eye-mountable device, in accordance with an embodiment of the disclosure.

FIG. 4B illustrates elements of a method 450 to operate an eye-mountable device according to an embodiment. Method 450 may be performed by an EMD disposed in or on an eye of a user—e.g., in cooperation with an auxiliary device that concurrently performs method 400, for example. Operations of method 400 may be performed by an EMD having features of one of EMDs 100, 200, 312.

In an embodiment, method 450 includes, at 455, detecting at a first time a first state of the eye-mountable device. Detection of the first state may include, for example, detecting a state of a capacitive, photodetector or other sensor mechanism that indicates a direction of gaze by a user of the EMD at the first time. Alternatively or in addition, the detecting at 455 may include detecting an optical strength provided with an accommodation actuator of the EMD at the first time. Detecting of the first state may be in response to a wireless communication from an auxiliary device that specifies or otherwise indicates the first time to the EMD—e.g., in a request, at or just before the first time, for the EMD to perform the detecting.

Method 450 may further comprise, at 460, receiving from an auxiliary device first signals indicating a first viewing action by the user at the first time. The first signals received at 460 may include, for example, some or all of the first signals sent at 410 of method 400. The first signals may be generated by the auxiliary device based on a first input received by the auxiliary device via a user interface of the auxiliary device. For example, an operator of the auxiliary device may provide such input to indicate that the first viewing action is being performed or will be performed, where the auxiliary device determines the first time and indicates the first time to the EMD based on such input.

Based on the first signals, method 450 may, at 465, generate first configuration information corresponding the first state with a characteristic of the first viewing action, wherein a first operational mode of the eye-mountable device is based on the first configuration information. In an embodiment, the first configuration information specifies or otherwise indicates an optical strength to be provided by an accommodation actuator during the first operational mode. Alternatively or in addition, the first configuration information may specify or otherwise indicate a possible direction of gaze (e.g., by indicating a range of possible gaze directions) by the user of the EMD during the first operational mode.

Method 450 may further comprise, at 470, detecting at a second time a second state of the eye-mountable device. The detecting at 470 may include features similar to those of the detecting at 455, where the second state is different than the first state. For example, the first state and the second state may differ from one another with respect to a level of accommodation provided with the accommodation actuator and/or with respect to a direction of gaze by the user of the EMD. At 475, method 400 may receive from the auxiliary device second signals indicating a second viewing action by the user at the second time, the second signals based on a second input received by the auxiliary device via the user interface. The second signals received at 475 may include, for example, some or all of the second signals sent at 420 of method 400. Based on the second signals, method 450 may, at 480, generate second configuration information indicating a correspondence of the second state to a characteristic of the second viewing action, wherein a second operational mode of the eye-mountable device is based on the second configuration information. Similar to the first configuration information, the second configuration information may define the second operational mode as providing a particular accommodation level for a particular gaze direction (e.g., range of gaze directions) by a user of the EMD.

FIG. 5 shows illustrative configuration information 500, 510 each to variously determine operational modes of an eye-mountable device according to a respective embodiment. Some or all of configuration information 500, 510 may be generated based on one or both of methods 400, 450, for example. The particular structure and contents of configuration information 500, 510 is merely illustrative, and may vary according to different embodiments.

For each of the EMD modes defined, configuration information 500 may include a respective mode identifier 502, a value OSV 504 representing a respective optical strength to be provided by the mode, and transition state information 506 indicating one or more events, the detection of which is to trigger a transition to (or alternatively, from) the operational mode. By way of illustration and not limitation, configuration information 500 may define a mode Ma to provide an optical strength indicated by a value Va representing, for example, a level and/or frequency of a signal to operate the accommodation actuator of the EMD. Control logic of the EMD may configure the operational mode Ma in response to detection of one or more events (including event ca) of a state Sa. Such one or more events may include a direction of gaze by a user of the EMD being—e.g., for at least some minimum threshold period of time—within a range of directions that have been defined as corresponding to the optical strength indicated by the value Va.

In addition to the definition of mode Ma, configuration information may define one or more other operational modes—e.g., including a mode Mb corresponding to an accommodation level indicated by value Vb. Based on configuration information 500, control logic of the EMD may provide the accommodation level represented by Va when a user satisfies the one or more conditions of state Sa, and may provide the accommodation level represented by Vb when a user satisfies the one or more conditions of state Sb. Additional and/or alternative EMD operational modes may be variously defined by configuration mode 500, according to different embodiments.

In some embodiments, control logic of an EMD supports multiple operational modes each comprising respective constituent operational modes, or sub-modes. During such a mode, the EMD may transition between sub-modes of that mode—e.g., based on a direction of gaze by the user of the EMD. Sub-modes of a given operational mode may each provide a different respective accommodation strength that, for example, correspond to different directions of gaze (e.g., different fields of gaze directions) by the user of the EMD.

By way of illustration and not limitation, configuration information 510 may include a respective mode identifier 520 for each of multiple operational modes, as represented by the illustrative modes Ma, Mb, . . . , Mn. Configuration information 510 may further include, for each of the respective sub-modes of the modes Ma, Mb, . . . , Mn, a respective sub-mode identifier 525 and a respective value OSV 530 representing an optical strength to be provided by that sub-mode. Sub-mode transition state information 535 of configuration information 510 may indicate, for a given sub-mode, one or more events to trigger a transition to (or alternatively, from) the given sub-mode. In some embodiments, configuration information 510 further comprises respective mode transition state information 540 for modes Ma, Mb, . . . , Mn. Mode transition state information 540 may indicate, for a given mode, one or more events to trigger a transition to (or alternatively, from) the given mode. For example, a next mode identifier 545 may indicate an operational mode to which the EMD is to transition in response to a corresponding mode transition state being satisfied. With respect to two modes each including respective sub-modes, different optical strength values may be variously associated by the two modes each with the same given direction of gaze by an EMD user. For example, sub-modes Ma1, Mb1 of respective modes Ma, Mb may each correspond to the same range of gaze directions by a EMD user, where the sub-modes Ma1, Mb1 are to provide different levels of accommodation represented by respective optical strength values Va1, Vb1.

Figures 6A, 6B:
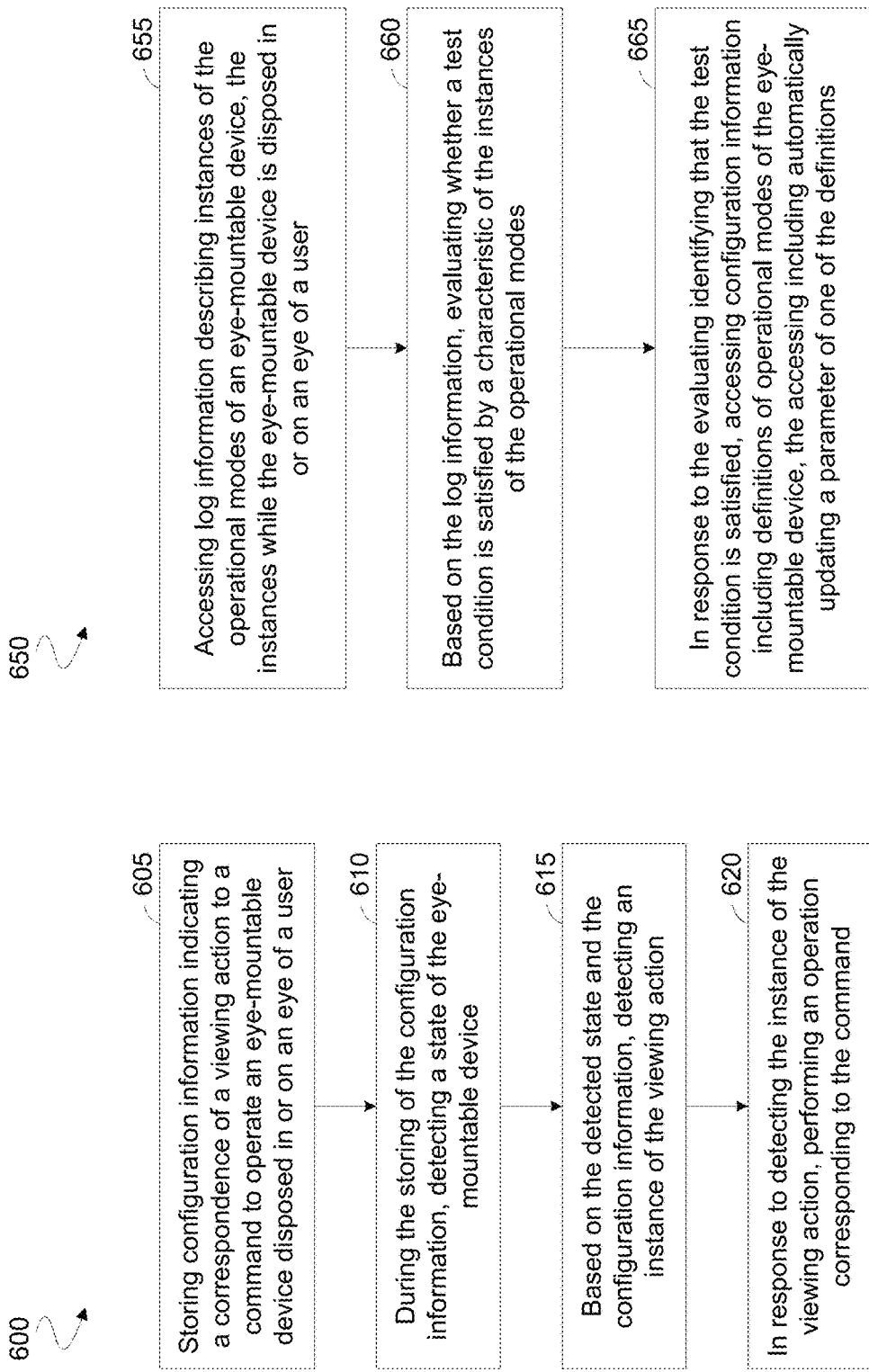
FIG. 6A is a flow diagram illustrating elements of a method for servicing a command with an eye-mountable device, in accordance with an embodiment of the disclosure.
FIG. 6B is a flow diagram illustrating elements of a method for maintaining configuration information of an eye-mountable device, in accordance with an embodiment of the disclosure.

FIG. 6A illustrates elements of a method 600 for operating an accommodation-capable eye-mountable device according to an embodiment. Method 600 may be performed by one of EMDs 100, 312, for example. In an embodiment, the EMD is calibrated, trained and/or otherwise configured based on interactions via a user interface of an auxiliary device during a management mode of the EMD.

Method 600 may comprise, at 605, storing configuration information indicating a correspondence of a viewing action to a command to operate an EMD disposed in or on an eye of a user. In an embodiment, control logic of the EMD is operable to service one or more explicit commands including, for example, a command to incrementally increase (or decrease) a level of accommodation, a command to disable (or enable) an function to transition from a current level of accommodation, a command to transition to a default level of accommodation and/or the like. Such one or more commands may be defined by the configuration information—e.g., as specified by a user of the EMD, a manufacturer of the EMD, a physician, technician, etc.

During the storing of the configuration information, method 600 may, at 610, detect a state of the eye-mountable device. The state detected at 610 may include a state of a capacitive, photodetector or other sensor mechanism that indicates a direction of gaze and/or a blinking by a user of the EMD. Based on the state detected at 610 and the configuration information, method 600 may, at 615, detect an instance of the viewing action. For example, the detecting at 615 may include comparing one or more parameters of the state information to one or more test conditions of the configuration information to indicate occurrence of the viewing action. Based on such comparison, the detecting at 615 may identify a gaze direction, change of gaze direction, blinking event and/or other action by the user of the EMD as signifying the issuing of the command.

In response to detecting the instance at 615, method 600 may, at 620, perform the operation of the EMD that is indicated by the command. In an embodiment, the command is serviced at 620 independent of a test condition for transitioning from an operational mode EMD that is configured during the detecting at 615. For example, performance of the operation at 620 may result in a transition of the EMD from a first operational mode to a second operational mode, where a test condition (as distinguished from a condition to test for the command) that would otherwise cause a transition from the first operational mode is not satisfied during the configuration of the first operational mode.

FIG. 6B illustrates elements of a method 650 for determining configuration information of an eye-mountable device according to an embodiment. Method 650 may be performed (for example, by an EMD or an auxiliary device) to update configuration information such as some or all of that shown in FIG. 5.

Method 650 may comprise, at 655, accessing log information describing instances of operational modes of an eye-mountable device disposed in or on an eye of a user. For example, control logic of the EMD may include or couple to a repository (e.g., memory 185) and circuitry to maintain in such repository a log specifying or otherwise indicating operational modes implemented over time by the EMD, durations of such operational modes, mode transitions that take place, viewing actions that occur during a given operational mode and/or the like.

Figure 7:
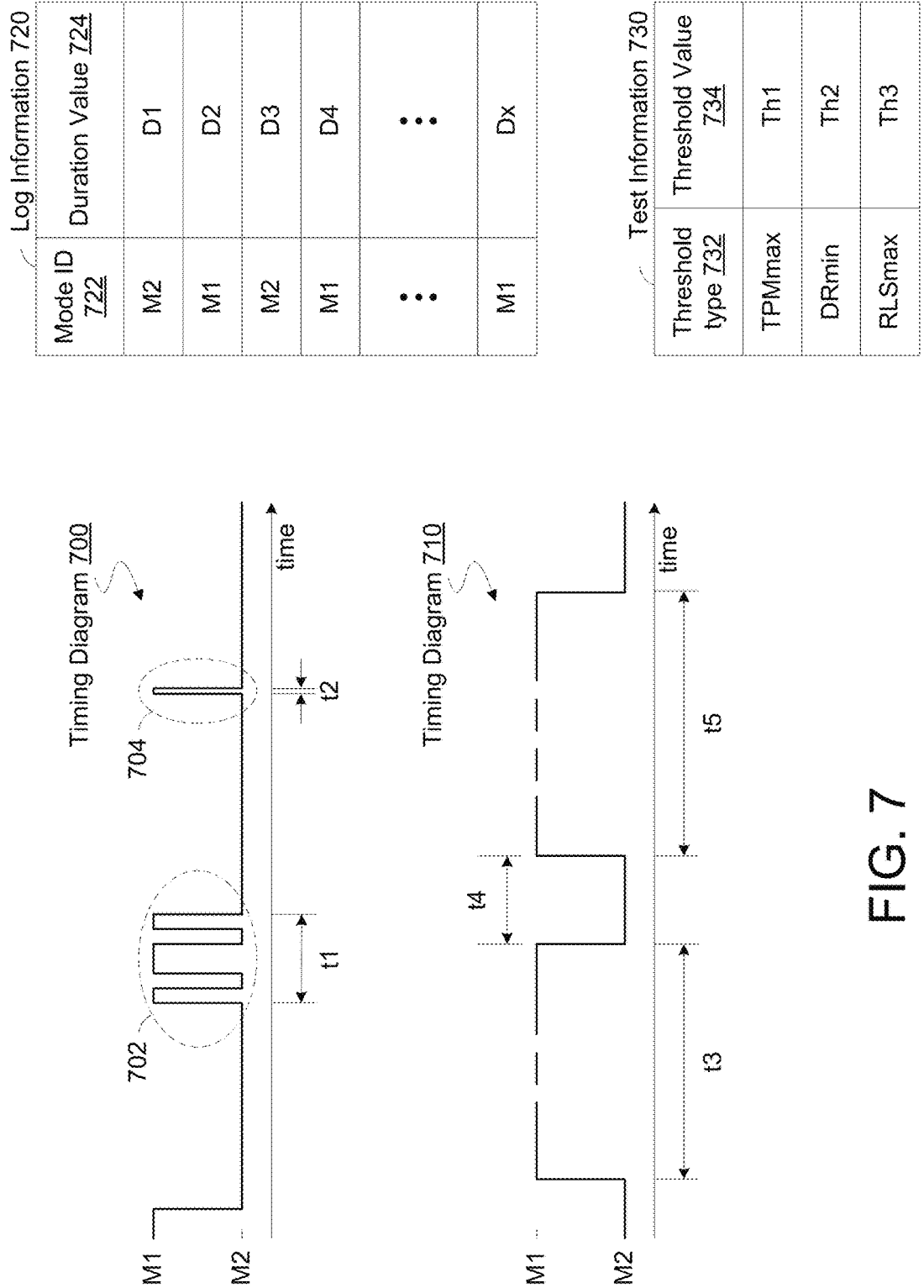
FIG. 7 includes timing diagrams each illustrating operation of a respective eye-mountable device to be evaluated, in accordance with a corresponding embodiment of the disclosure.

In an illustrative scenario according to one embodiment, an EMD may maintain log information 720, as illustrated in FIG. 7, including identifiers 722 of modes that have been implemented over a period of time. Although certain embodiments are not limited in this regard, only two modes (M1, M2) are represented in log information 720. Log information 720 may further comprise duration values 724 each representing a length of time that a respective mode was implemented—e.g., where a mode M1 is implemented for a duration D1, then mode M2 for a duration D2, then M1 for a duration D3, etc.

Based on the information in such a log, method 650 may, at 660, evaluate whether a test condition is satisfied by a characteristic of the instances of the operational modes. For example, log information may be compared to, or otherwise processed based on one or more test conditions to determine whether such one or more test conditions have been met. One example of such one or more test conditions is represented by the illustrative test information 730 of FIG. 7, which identifies for each of one or more threshold types 732 a respective threshold value 734. Although certain embodiments are not limited in this regard, test information 730 may include a maximum number TPMmax of mode transitions that may take place in a given time duration (e.g., transitions per minute). Alternatively or in addition, test information 730 may include a minimum duration DRmin of a given operational mode. In some embodiments, test information 730 includes a maximum ratio RLSmax of a total duration of two instances of a first mode to a duration of an instance of a different mode (e.g., between the two instance of the first mode). The threshold values Th1, Th2, Th3 shown for test information 730 may be provided as a priori information from a manufacturer or other authority, for example.

As illustrated in timing diagram 700 of FIG. 7, the evaluating at 660 may comprise detecting that a number of transitions 702 between modes M1, M2 within a time period t1 exceeds Th1. Alternatively or in addition, the evaluating at 660 may include identifying a duration 704 of an instance of mode M1 that is less than Th2.

As illustrated with reference to timing diagram 710 of FIG. 7, the evaluating at 660 may comprise identifying durations t3, t5 of respective instances M2 and a duration t4 of an instance of mode M1, and determining that a ratio of a sum (t3+t5) to t4 is greater than Th3.

In response to the evaluating at 660 identifying that the test condition is satisfied, method 650 may, at 665, access configuration information including definitions of operational modes of the eye-mountable device, the accessing including automatically updating a parameter of one of the definitions. For example, the accessing at 665 may comprise updating transition state information such as that of configuration information 500, 510. For example, test condition to determine whether an operational mode is to change may specify a minimum length of time that a user is gazing in a particular direction (e.g., in a field of gaze directions). In such an embodiment, the accessing at 665 may change one or more parameter values to change the minimum length of time and/or a field of gaze directions). The changed one or more parameter value may make a particular mode transition easier to take place or more difficult to take place, depending on the prior performance of the EMD.

In some embodiments, log information such as that represented in FIG. 7 and/or that accessed in method 650 may be downloaded from an EMD to an auxiliary device. Such downloading may take place automatically—e.g., independent of a user of the EMD explicitly commanding and/or being aware of such download. For example, a download may happen automatically in response to a wireless presence detection exchange between the EMD and the auxiliary device. Such downloading of log information may additionally or alternatively take place, for example, independent of any automatic updating of configuration information in method 650 and/or independent of any interaction by an operator with a user interface of the auxiliary device. The downloaded log information may be made available from the auxiliary device via a user interface and/or a network to any of a variety of one or more consumers including, but not limited to, a user of the EMD, a physician or technician, a manufacturer of an EMD or the like.

What is claimed is:

1. A non-transitory computer-readable storage medium having stored thereon instructions which, when executed by one or more processing units, cause the one or more processing units to perform a method comprising:

with a user interface of an auxiliary device, prompting a user to perform a first viewing action in a first gaze direction with an eye-mountable device disposed in or on an eye of the user, wherein the eye-mountable device includes a sensor;

causing, by the auxiliary device, an actuator of the eye-mountable device to successively provide different accommodating levels corresponding to a first set of accommodation levels during the first viewing action;

receiving, from the eye-mountable device, first sensor information generated with the sensor concurrently with the first viewing action;

receiving, by the auxiliary device, an indication of a first accommodation level of the first set of accommodation levels;
with the user interface, prompting the user to perform a second viewing action in a second gaze direction with the eye-mountable device;
receiving, from the eye-mountable device, second sensor information generated with the sensor concurrently with the second viewing action; and
determining first and second configuration information of the eye-mountable device, wherein the first configuration information includes a correspondence between the first sensor information, the first accommodation level, and the first gaze direction, and wherein the second configuration information at least includes a correspondence of the second sensor information to the second gaze direction, and wherein the eye-wearable device is configured to operate in a first or second mode based on the first or second configuration information, respectively.

2. The computer-readable storage medium of claim 1, wherein the first viewing action or the second viewing action comprises viewing in a downward gaze direction.

3. The computer-readable storage medium of claim 1, wherein the first viewing action or the second viewing action comprises a blinking action.

4. The computer-readable storage medium of claim 1, the method further comprising:
exchanging with the eye-mountable device communications identifying one or more viewing actions, wherein based on the communications and third sensor information corresponding to the one or more viewing actions, the eye-mountable device identifies the one or more viewing actions as an explicit command to operate the eye-mountable device.

5. The computer-readable storage medium of claim 4, wherein the explicit command specifies that the eye-mountable device is to transition to an operational mode that provides a default level of accommodation.

6. The computer-readable storage medium of claim 4, wherein the explicit command disables a function to change a level of accommodation.

7. The computer-readable storage medium of claim 4, wherein the explicit command specifies that the eye-mountable device is to incrementally increase or incrementally decrease a level of accommodation.

8. The computer-readable storage medium of claim 1, the method further comprising:
downloading from the eye-mountable device log information describing instances of operational modes of the eye-mountable device.

9. The computer-readable storage medium of claim 8, the method further comprising:
based on the log information, evaluating, by the auxiliary device, whether a test condition is satisfied by a characteristic of the instances of the operational modes; and
in response to the evaluating identifying that the test condition is satisfied, accessing, by the auxiliary device, configuration information including definitions of operational modes of the eye-mountable device, the accessing including automatically updating a parameter of one of the definitions.

10. A method comprising:
with a user interface of an auxiliary device, prompting a user to perform a first viewing action in a first gaze direction with an eye-mountable device disposed in or on an eye of the user, wherein the eye-mountable device includes a sensor;
causing, by the auxiliary device, an actuator of the eye-mountable device to successively provide different accommodating levels corresponding a first set of different accommodation levels during the first viewing action;
receiving, from the eye-mountable device, first sensor information generated with the sensor concurrently with the first viewing action;
receiving, by the auxiliary device, an indication of a first accommodation level of the first set of different accommodation levels;
with the user interface, prompting the user to perform a second viewing action in a second gaze direction with the eye-mountable device;
receiving, from the eye-mountable device, second sensor information generated with the sensor concurrently with the second viewing action; and
determining first and second configuration information of the eye-mountable device, wherein the first configuration information includes a correspondence between the first sensor information, the first accommodation level, and the first gaze direction, and wherein the second configuration information at least includes a correspondence of the second sensor information to the second gaze direction, and wherein the eye-wearable device is configured to operate in a first or second mode based on the first or second configuration information, respectively.

11. The method of claim 10, wherein the first viewing action or the second viewing action comprises a blinking action.

12. The method of claim 10, further comprising:
exchanging with the eye-mountable device communications identifying one or more viewing actions, wherein based on the communications and third sensor information corresponding to the one or more viewing actions, the eye-mountable device identifies the one or more viewing actions as an explicit command to operate the eye-mountable device.

13. The method of claim 10, further comprising:
downloading from the eye-mountable device log information describing instances of operational modes of the eye-mountable device.

14. The method of claim 13, the method further comprising:
based on the log information, evaluating, by the auxiliary device, whether a test condition is satisfied by a characteristic of the instances of the operational modes; and
in response to the evaluating identifying that the test condition is satisfied, accessing, by the auxiliary device, configuration information including definitions of operational modes of the eye-mountable device, the accessing including automatically updating a parameter of one of the definitions.

15. An eye-mountable device, comprising:
an enclosure;
an accommodation actuator disposed within the enclosure; and
communication logic including integrated circuitry configured to receive from an auxiliary device:
first signals indicating a first viewing action in a first gaze direction by a user of the eye-mountable device, the first signals based on a first input received by the auxiliary device via a user interface of the auxiliary device, wherein the first signals cause the accommodation actuator to successively provide different accommodation levels corresponding to a first set of different accommodation levels during the first viewing action, and wherein the first signals further include an indication of a first accommodation level of the first set of different accommodation levels; and second signals indicating a second viewing action in a second gaze direction by the user, the second signals based on a second input received by the auxiliary device via the user interface, wherein the second signals cause the accommodation actuator to successively provide different accommodation levels corresponding to a second set of different accommodation levels during the second viewing action, and wherein the second signals further include an indication of a second accommodation level of the second set of different accommodation levels; and a sensor, disposed within the enclosure, to generate first sensor information concurrently with the first viewing action, the sensor further to generate second sensor information concurrently with the second viewing action; and control logic including integrated circuitry configured to detect, based on the first sensor information and the first accommodation level, a first state of the eye-mountable device and configured to detect, based on the second sensor information and the second accommodation level, a second state of the eye-mountable device, wherein based on the first signals and the first sensor information, the control logic is configured to generate first configuration information which includes a correspondence of the first state to the first gaze direction, and wherein the eye-mountable device is to operate in a first mode based on the first configuration information, and wherein based on the second signals and the second sensor information, the control logic is configured to generate second configuration information which includes a correspondence of the second state to the second gaze direction, and wherein the eye-mountable device is to operate in a second mode based on the second configuration information.

16. The eye-mountable device of claim 15, the control logic further configured to:

access log information describing instances of operational modes of the eye-mountable device;

based on the log information, evaluate whether a test condition is satisfied by a characteristic of the instances of the operational modes; and in response to identifying that the test condition is satisfied, access configuration information including definitions of operational modes of the eye-mountable device, the accessing including automatically updating a parameter of one of the definitions.

17. The eye-mountable device of claim 15, the control logic further configured to:

store configuration information indicating a correspondence of a viewing action to a command to operate an eye-mountable device disposed in or on an eye of a user;

while the configuration information is stored, detect a state of the eye-mountable device;

based on the detected state and the configuration information, detect an instance of the viewing action; and in response to detecting the instance of the viewing action, perform an operation corresponding to the command.

18. The eye-mountable device of claim 17, wherein the control logic configured to perform the operation includes the control logic configured to transition to an operational mode that provides a default level of accommodation.

19. The eye-mountable device of claim 17, wherein the control logic configured to perform the operation includes the control logic configured to disable a function to change a level of accommodation.

20. The eye-mountable device of claim 15, the control logic further configured to:

maintain log information describing instances of operational modes of the eye-mountable device; and download the log information from the eye-mountable device to an external device.

21. A method implemented by an eye-mountable device, the method comprising:

generating first sensor information concurrently with a first state of the eye-mountable device;

receiving from an auxiliary device first signals indicating a first viewing action in a first gaze direction by the user, the first signals based on one or more first inputs received by the auxiliary device via a user interface of the auxiliary device;

causing, based on the first signals, to successively provide different accommodation levels corresponding to a first set of different accommodation levels to be provided by an accommodation actuator of the eye-mountable device during the first viewing action;

receiving, included in the first signals, an indication of a first accommodation level of the first set of different accommodation levels, wherein the first accommodation level is included in the first state;

based on the first signals and the first sensor information, generating first configuration information including a correspondence of the first state to a first gaze direction, wherein the eye-mountable device operates in a first mode based on the first configuration information;

generating second sensor information concurrently with a second state of the eye-mountable device;

receiving from the auxiliary device second signals indicating a second viewing action in a second gaze direction by the user, the second signals based on one or more second inputs received by the auxiliary device via the user interface;

causing, based on the second signals, to successively provide different accommodation levels corresponding to a second set of different accommodation levels to be provided by the accommodation actuator of the eye-mountable device during the second viewing action;

receiving, included in the second signals, an indication of a second accommodation level of the second set of different accommodation levels, wherein the second accommodation level is included in the second state; and based on the second signals and the second sensor information, generating second configuration information including a correspondence of the second state to a second gaze direction, wherein the eye-mountable device operates in a second mode based on the second configuration information.

22. The method of claim 21, further comprising:

accessing log information describing instances of operational modes of the eye-mountable device;

based on the log information, evaluating whether a test condition is satisfied by a characteristic of the instances of the operational modes; and in response to the evaluating identifying that the test condition is satisfied, accessing configuration information including definitions of operational modes of the eye-mountable device, the accessing including automatically updating a parameter of one of the definitions.

23. The method of claim 21, further comprising:

storing configuration information indicating a correspondence of a viewing action to a command to operate an eye-mountable device disposed in or on an eye of a user;

during the storing of the configuration information, detecting a state of the eye-mountable device;

based on the detected state and the configuration information, detecting an instance of the viewing action; and in response to detecting the instance of the viewing action, performing an operation corresponding to the command.

24. The computer-readable storage medium of claim 1, further comprising:

causing, by the auxiliary device, an actuator of the eye-mountable device to provide a second set of different accommodation levels;

receiving, by the auxiliary device, an indication of a second accommodation level of the second set of different accommodation levels, and wherein the second configuration information further includes a correspondence between the second sensor information, the second accommodation level, and the second gaze direction.

* * * * *